(12) United States Patent  (10) Patent No.: US 8,043,760 B2
Okamoto et al.  (45) Date of Patent: Oct. 25, 2011

(54) ELECTROCHEMICAL CELL STACKS

(75) Inventors: Taku Okamoto, Nagoya (JP); Takashi Ryu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 133 days.

(21) Appl. No.: 12/557,901

(22) Filed: Sep. 11, 2009

(65) Prior Publication Data

US 2010/0003579 A1 Jan. 7, 2010

Related U.S. Application Data

(63) Continuation of application No. PCT/JP2008/056636, filed on Mar. 27, 2008.

(30) Foreign Application Priority Data

Mar. 28, 2007 (JP) ................................. 2007-083999

(51) Int. Cl.
H01M 2/38 (2006.01)
(52) U.S. Cl. ........ 429/455; 429/456; 429/491; 429/508; 429/513
(58) Field of Classification Search .................. 429/455, 429/456, 459, 460, 491, 495, 508, 509, 513
See application file for complete search history.

(56) References Cited

U.S. PATENT DOCUMENTS

| 6,492,050 | B1 * | 12/2002 | Sammes | ........................ | 429/423 |
| 2006/0246331 | A1 * | 11/2006 | Steinbroner | ..................... | 429/23 |
| 2008/0206618 | A1 | 8/2008 | Ichigi et al. | | |

FOREIGN PATENT DOCUMENTS

| EP | 0 355 420 A1 | 2/1990 |
| EP | 2 023 431 A1 | 2/2009 |
| JP | 01-128366 A1 | 5/1989 |
| JP | 03-067468 A1 | 3/1991 |
| JP | 03-219563 A1 | 9/1991 |
| JP | 05-101842 A1 | 4/1993 |
| JP | 06-310164 A1 | 11/1994 |
| JP | 11-233127 | 8/1999 |
| JP | 2008-010255 A1 | 1/2008 |
| JP | 2008-034373 A1 | 2/2008 |
| WO | 2007/029860 A1 | 3/2007 |
| WO | 2007/138984 A1 | 12/2007 |

OTHER PUBLICATIONS

O.T. Ryu, et al., "*Generating Performance of the Gas Channel Integrated SOFC Cell*," The 15th Symposium on Solid Oxide Fuel Cells, Tokyo, Japan, The Solid Oxide Fuel Cell Society of Japan, Dec. 5-6, 2006, pp. 212-215.

* cited by examiner

*Primary Examiner* — Raymond Alejandro
(74) *Attorney, Agent, or Firm* — Burr & Brown

(57) ABSTRACT

An electrochemical apparatus having a plurality of ceramic electrochemical cells, a plurality of gas feed members and a plurality of gas discharge members. The electrochemical cell has a first electrode contacting with a first gas, a solid electrolyte layer and a second electrode contacting with a second gas. A gas flow channel for flowing the first gas therethrough, a first through hole and a second through hole are provided in the electrochemical cell. The gas feed member is inserted into the first through hole, the gas discharge member is inserted into the second through hole. The adjacent gas feed members are airtightly coupled to each other thereby forming a gas feed channel, and the adjacent gas discharge members are airtightly coupled to each other thereby forming a gas discharge channel.

24 Claims, 9 Drawing Sheets

ELECTROCHEMICAL CELL STACKS

FIELD OF THE INVENTION

The present invention relates to an electrochemical apparatus such as a solid oxide fuel cell.

BACKGROUND OF THE INVENTION

A plurality of cells must be laminated (stacked) in order to obtain a high power output since the voltage per fuel cell is approximately 1 V. For this reason, how the number of laminated cells can be increased to obtain the high power output in a reduced size becomes an issue that needs to be solved.

In WO 2007/029860 A1, especially in FIG. 14, a fuel flow channel is formed, for example, inside a fuel electrode of a ceramic electrochemical cell, in which a solid electrolyte film and an air electrode film are formed on the fuel electrode. Then, after providing a gas feed port and a gas discharge port to a cell itself, a plurality of the cells are directly laminated to form a stack. In the course of constructing the stack, the gas feed port of each of the adjacent cells are arranged so as to continue to each other, thereby forming a gas feed channel, while a gas discharge port of each cell is arranged so as to continue to each other, thereby forming a gas discharge channel.

SUMMARY OF THE INVENTION

For stacks (batteries) such as described in WO 2007/029860 A1, cells that include, in the inside thereof, a gas flow channel are attached to stationary members, which are then stacked. However, since the thus-constructed cells also serve as structural members, stresses tend to be applied onto the cells. In particular, in light of lower structural strength of the cells including, in the inside thereof, a gas flow channel other than the cells having no such gas flow channel, therefore provides a desirable structure in which the cells alone are not subjected to stress.

An object of the present invention is to stack a plurality of electrochemical cells without applying an excessive stress onto the electrochemical cells.

The present invention provides an electrochemical apparatus comprising a plurality of ceramic electrochemical cells, a plurality of gas feed members and a plurality of gas discharge members. This electrochemical cell comprises a first electrode coming into contact with a first gas, a solid electrolyte layer, and a second electrode coming into contact with a second gas, in which a gas flow channel for flowing the first gas is formed inside the first electrode. Further, a first through hole and a second through hole are provided in the electrochemical cell. The gas feed member is inserted into the first through hole, while the gas discharge member is inserted into the second through hole. Then, mutually adjacent gas feed members are airtightly coupled to each other, thereby forming a gas feed channel, while mutually adjacent gas discharge members are airtightly coupled to each other, thereby forming a gas discharge channel. The gas feed channel and the gas discharge channel are communicated with the gas flow channels in the cells, and the plurality of electrochemical cells are supported by the gas feed members and the gas discharge members in a state where the electrochemical cells are spaced apart from each other.

According to the present invention, the gas feed members are inserted into the first through holes, respectively, while the gas discharge members are inserted into the second through holes, respectively. In addition, the gas feed channel is formed by airtightly coupling the adjacent gas feed members to each other, while the gas discharge channel is formed by airtightly coupling the adjacent gas discharge members to each other. Then, both the gas feed channels and the gas discharge channels are communicated with the gas flow channels provided inside the electrochemical cells, and the plurality of electrochemical cells are supported by the gas feed members and the gas discharge members in the state where the electrochemical cells are spaced apart from each other.

In the stacked structure of the cells described in WO 2007/029860 A1, since the electrochemical cells also serve as the structural members, a stress tends to be exerted on the cells themselves. On the other hand, since, in the present invention, the plurality of electrochemical cells are supported by the coupled gas feed and discharge members in the state where the electrochemical cells are spaced apart from each other, the stress is applied only to the gas feed and discharge members, with a result that application of the stress between the electrochemical cells can be prevented.

DETAILED DESCRIPTION OF THE INVENTION

Figure 1:
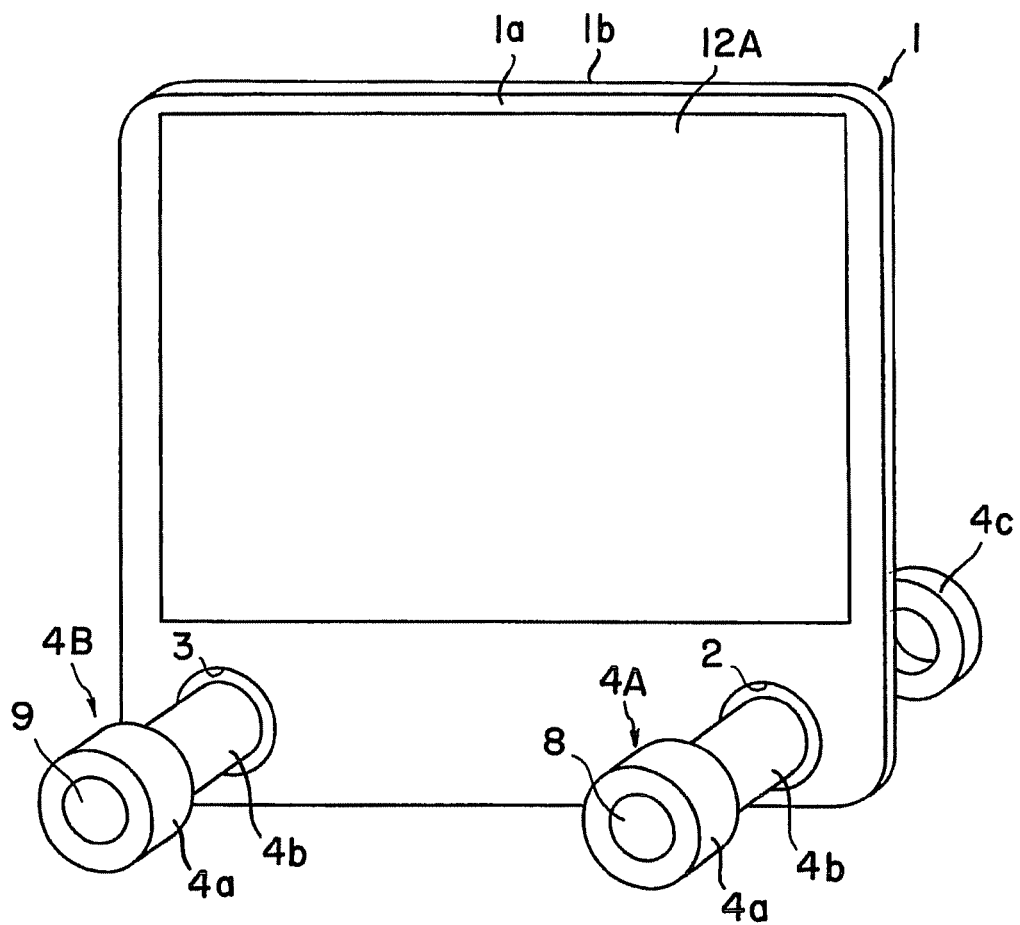
FIG. 1 is a perspective view showing an electrochemical cell 1 according to one embodiment of the present invention, with a gas feed member 4A and a gas discharge member 4B attached thereto.

In the present invention, an electrochemical cell is preferably in the form of a plate. However, the electrochemical cell is not limited to a flat-shaped plate, and may be a curved plate or an arc-shaped plate. The electrochemical cell comprises a first electrode which comes into contact with a first gas, a solid electrolyte film, and a second electrode which comes into contact with a second gas.

Here, the first electrode and the second electrode are selected from an anode or a cathode. When one of the first and second electrodes is the anode, the other is the cathode. Similarly to this, the first gas and the second gas are selected from an oxidizing gas or a reducing gas.

The oxidizing gas is not particularly limited, and may be any gas as long as capable of supplying oxygen ions to the solid electrolyte film, including air, diluted air, oxygen, and diluted oxygen. As the reducing gas, $H_2$, CO, $CH_4$, and a mixed gas thereof are exemplified.

The electrochemical cell to which the present invention is applied refers to, in general, cells for causing an electrochemical reaction. For example, the electrochemical cell can be used as an oxygen pump or a high temperature steam electrolytic cell. The high temperature steam electrolytic cell can be used in a hydrogen production unit, or can be used in a water vapor removal device. Further, the electrochemical cell can be used as a decomposition cell for NOx and SOx. The decomposition cell can be used in a purifier to clean up an exhaust gas from an automobile or from a power generator. In this case, as well as removing oxygen in the exhaust gas through a solid electrolyte film, NOx is electrolyzed into $N_2$ and $O_2$, so that oxygen generated by the electrolyzation can be also removes. Further, with this process, since water vapor in the exhaust gas is electrolyzed to thereby produce hydrogen and oxygen, the thus produced hydrogen reduces NOx to $N_2$. Moreover, in a preferred embodiment, the electrochemical cell is a solid oxide fuel cell.

The material of a solid electrolyte is not particularly limited, and any oxide ion conductor may be used. For example, the material may be yttria-stabilized zirconia or yttria partially stabilized zirconia. For NOx decomposition cell, cerium oxide is also preferable.

The material of the cathode is preferably lanthanum-containing perovskite-type composite oxide, and more preferably lanthanum manganite or lanthanum cobaltite, in which lanthanum manganite is further more preferable. The lanthanum cobaltite and lanthanum manganite may be doped with strontium, calcium, chromium, cobalt (in the case of lanthanum manganite), iron, nickel, aluminum or the like.

For the material of the anode, nickel-magnesia alumina spinel, nickel-nickel alumina spinel, nickel-zirconia, platinum-cerium oxide, ruthenium-zirconia and the like are preferable.

A configuration of each electrochemical cell is not specifically limited. The electrochemical cell may be composed of three layers of the anode, the cathode, and the solid electrolyte layer. Alternatively, the electrochemical cell may include, for example, a porous layer in addition to the anode, the cathode, and the solid electrolyte layer.

In the present invention, the electrochemical cell is provided with a gas flow channel into which a first gas is introduced, a first through hole, and a second through hole. The configuration of the gas flow channel, the numbers and locations of the first through holes and the second through holes are not particularly limited. However, the first through holes should be separated from the second through holes.

In the present invention, a method for coupling the gas feed members with the electrochemical cell and a method for coupling the gas discharge members with the electrochemical cell are not particularly limited. For the coupling, a glass or ceramic adhesive, or a mechanical coupling method, for example, can be used. In addition, although a method for airtightly sealing the gas feed members and the electrochemical cell and a method for airtightly sealing the gas discharge members and the electrochemical cell are not particularly limited, it is preferable to use a sealing member for the airtight sealing. The material of such a sealing member is not specifically limited, but should be resistant to both oxidation and reduction at operating temperatures of the electrochemical cell. Specifically, a silica-based glass, a silica-based crystallized glass, a blazing metal and the like may be exemplified. Moreover, the examples further include an O ring, a C ring, an E ring, and a compression seal such as a metal-jacketed gasket or a mica gasket.

Methods for coupling adjacent gas feed members to each other and for coupling adjacent gas discharge members to each other are not particularly limited. For example, a glass or ceramic adhesive, or a mechanical coupling method may be used for the coupling. In addition, the method for airtight sealing is not particularly limited, but it is preferable that the above-described sealing material is used for the sealing.

In a preferable embodiment, the gas feed member and/or gas discharge member includes a tubular section inserted into the through hole, a first flange section provided on one end of the tubular section, and a second flange section provided on the other end of the tubular section. Further, a first sealing member is installed between the first flange section and the electrochemical cell, while a second sealing member is installed between the second flange section and the electrochemical cell. In this way, airtightness of sealing between the electrochemical cell and the gas feed member and/or the gas discharge member is further enhanced.

There is no limitation to the tubular section when the gas feed member and/or the gas discharge member are the tubular section. The cross-sectional shape of the tubular section may be, for example, a perfect circle, an oval figure, a polygon such as a triangle, a quadrangle or a hexagon.

Hereinafter, the present invention will be further described in detail with reference to the drawings as appropriate.

Figure 2:
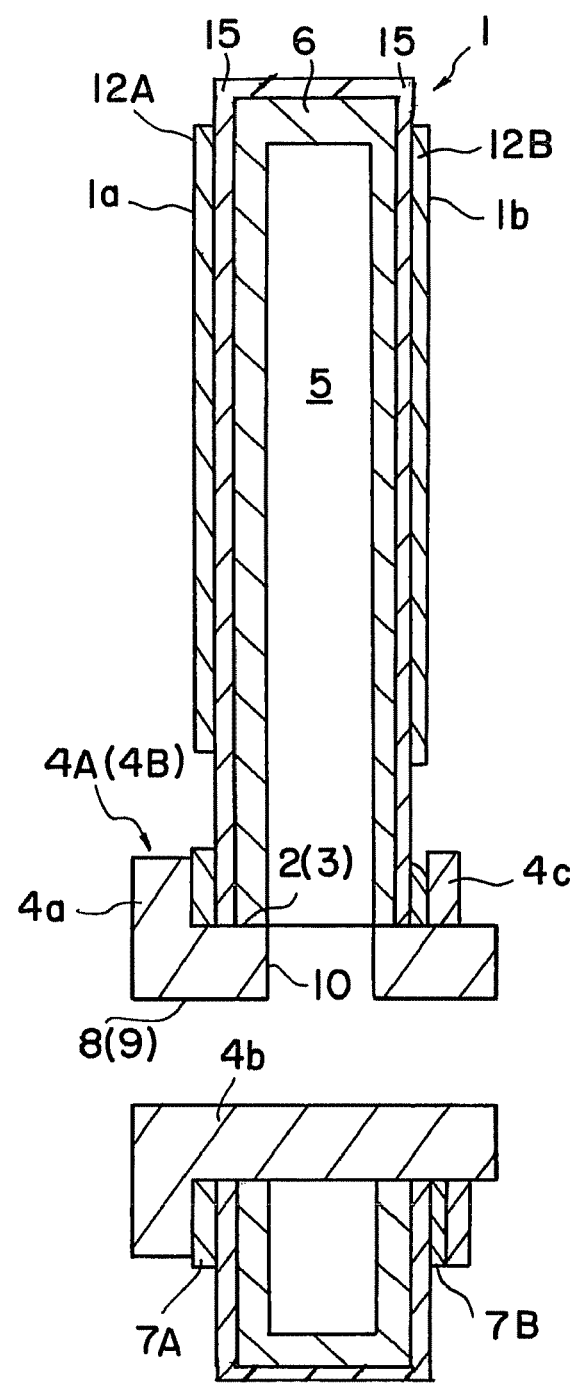
FIG. 2 is a cross-sectional view showing the electrochemical cell 1 according to one embodiment of the present invention, with the gas feed member 4A and the gas discharge member 4B attached thereto.
Figure 3:
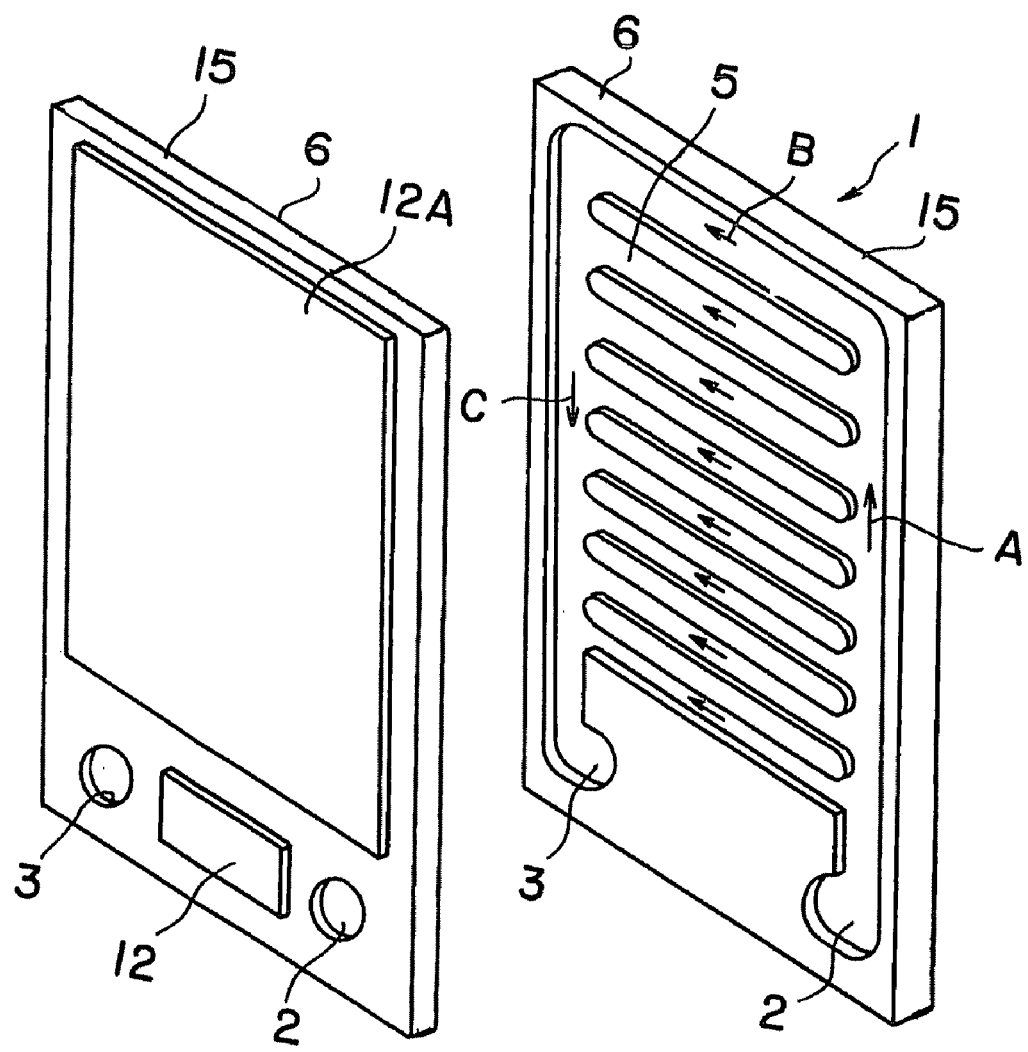
FIG. 3 is an exploded perspective view showing the electrochemical cell 1 separated into two parts.

FIG. 1 is a perspective view showing an electrochemical cell 1 of one embodiment of the present invention with a gas feed member 4A and a gas discharge member 4B attached thereto, and FIG. 2 is a cross-sectional view showing the electrochemical cell 1 of one embodiment of the present invention with the gas feed member 4A and the gas discharge member 4B attached thereto. FIG. 3 is an exploded perspective view showing the electrochemical cell 1 separated into two parts.

In particular, as shown in FIGS. 2 and 3, a gas flow channel 5 through which a first gas flows is formed inside a first electrode 6 of the electrochemical cell 1. The first electrode 6 is in the form of a plate, and solid electrolyte layers 15 are respectively mounted on both main surfaces and all side surfaces of the first electrode 6. Second electrodes 12A, 12B are respectively formed on each of the solid electrolyte layers 15 located on the both main surfaces. The second electrodes 12A, 12B are exposed on the both main surfaces of the cell 1, while a connecting pad 12 electrically conducted to the first electrode 6 is exposed on a lower portion of the cell 1.

A first through hole 2 and a second through hole 3 are formed at predetermined locations in the electrochemical cell 1. A gas feed member 4A is inserted into the first through hole 2, which is then sealed airtightly. In this example, the gas feed member 4A has a first flange section 4a, a tubular section 4b, and a second flange section 4c. Then, the tubular section 4b is inserted into the first through hole 2. A sealing member 7A is interposed between the first flange section 4a and one main surface 1a of the cell 1. A sealing member 7B is interposed between the second flange section 4c and the other main surface 1b of the cell 1. In this example, a washer which can be fitted on the tubular section is implemented as the second flange section 4c, whereby airtight sealing can be ensured. A gas feed channel 8 is communicated through a distributing port 10 with the gas flow channel 5 inside the cell.

A gas discharge member 4B is inserted into the second through hole 3, which is then sealed airtightly. In this example, the gas discharge member 4B has the first flange section 4a, the tubular section 4b, and the second flange section 4c. Then, the tubular section 4b is inserted into the second through hole 3. The sealing member 7A is interposed between the first flange section 4a and the one main surface 1a of the cell 1. The sealing member 7B is interposed between the second flange section 4c and the other principle surface 1b of the cell 1. In this example, the washer which can be fitted on the tubular section is implemented as the second flange section 4c, whereby airtight sealing can be ensured. A gas discharge channel 9 is communicated with the gas flow channel 5 inside the cell.

It is conceivable that at the time of coupling the cell with the gas feed member and the gas discharge member, a thermal stress could be exerted, due to a difference in thermal expansion between both materials of the components, on the cell which is lower in strength, with a result that the cell might be damaged. In order to prevent this, it is preferable that a difference in coefficient of thermal expansion between the gas feed member and the electrochemical cell is set so as not to exceed $2\times10^{-6}$ (/K), and that the difference in coefficient of thermal expansion between the gas discharge member and the electrochemical cell is set so as not to exceed $2\times10^{-6}$ (/K). The above differences in coefficient of thermal expansion are obtained by the measurements conducted at temperatures of from 25° C. to 800° C.

Figure 4:
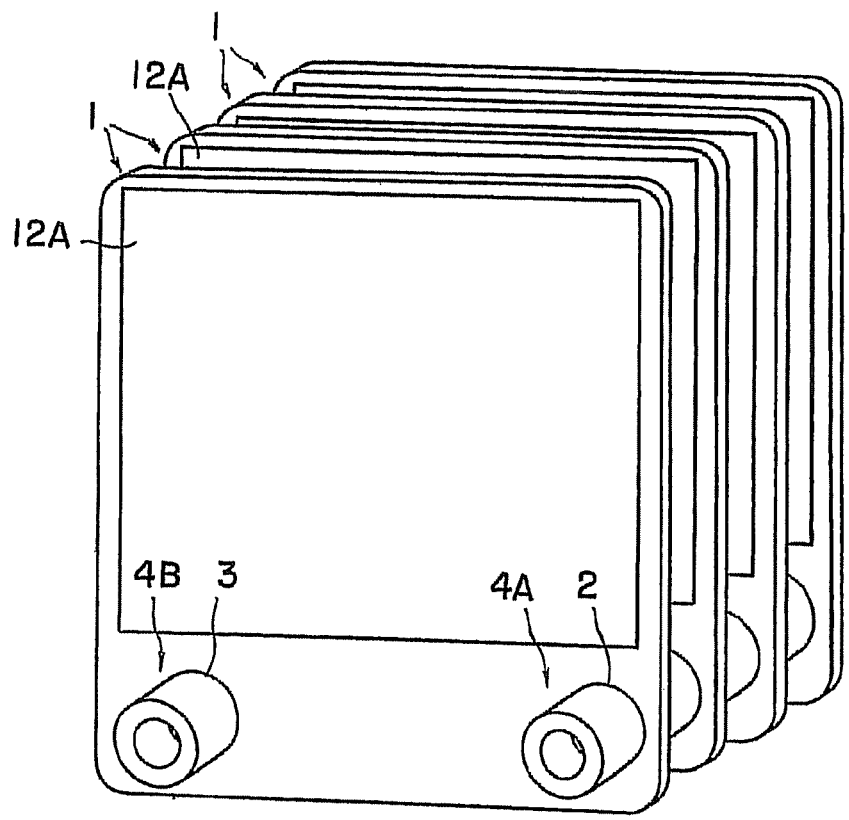
FIG. 4 is a perspective view showing a stacked form of a plurality of the cells 1 coupled by the gas feed members and the gas discharge members.
Figure 5:
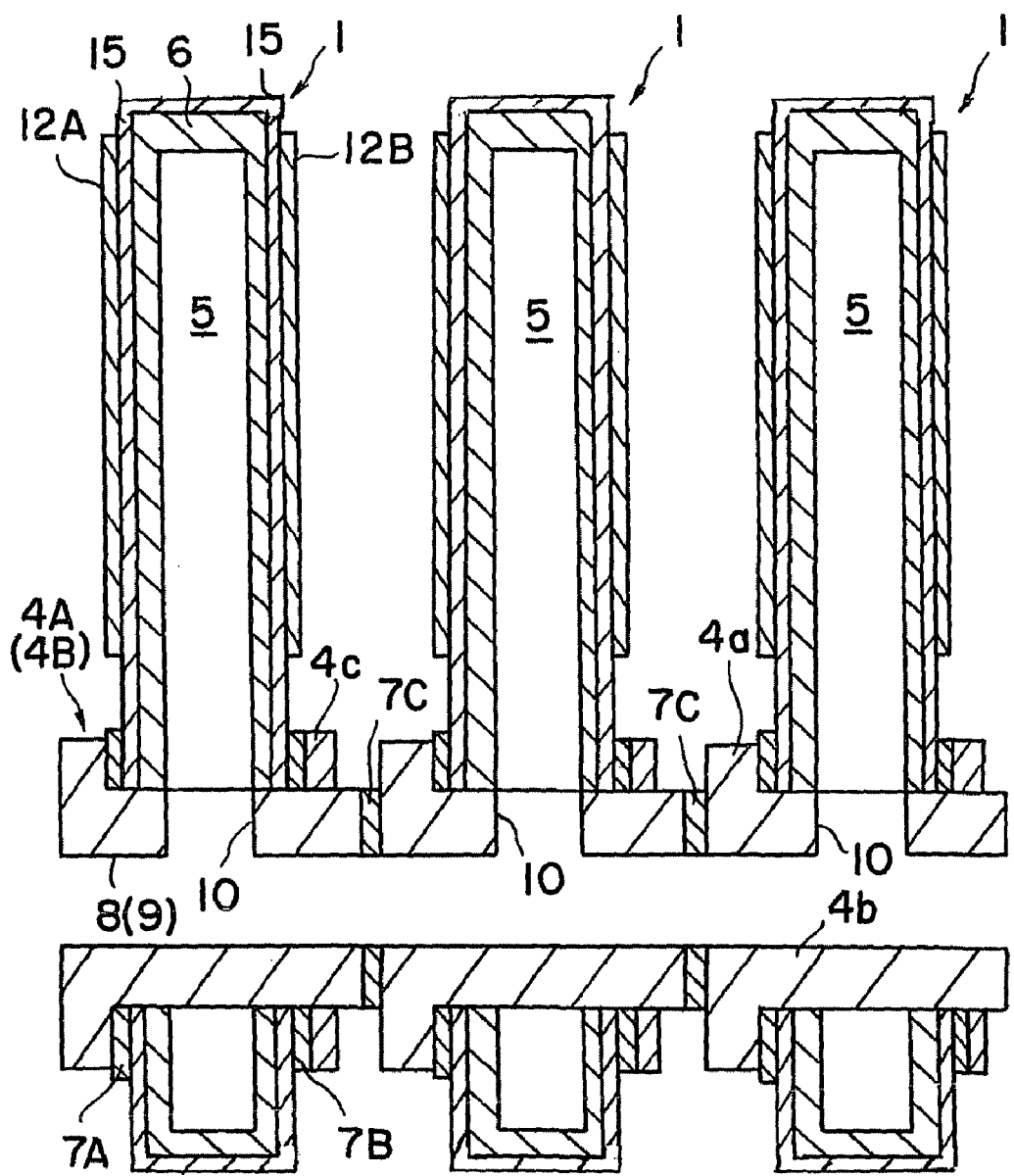
FIG. 5 is a cross-sectional view showing the stacked form of the plurality of the cells 1 coupled by the gas feed members and the gas discharge members.

FIG. 4 is a perspective view showing a stacked form of a plurality of the cells 1 coupled through the gas feed members and the gas discharge members, and FIG. 5 is a cross-sectional view of the same. A plurality of the gas feed members 4A are coupled via the sealing members 7C to each other, thereby forming the gas feed channel. Further, a plurality of the gas discharge members 4B are coupled via the sealing members 7C to each other, thereby forming the gas discharge channel. A plurality of the cells are fastened by the coupled gas feed members and gas discharge members, and retained in a mutually spaced apart state.

In particular, as shown in FIG. 3, the first gas is supplied from the gas feed channel via the distributing port 10 into the gas flow channel 5, flows in the gas discharge channel as indicated by arrows A, B and C, and is then discharged through the coupled gas discharge members to the outside.

The materials of the gas feed member and the gas discharge member are not particularly limited as long as a mechanical strength of the material is higher than that of ceramics which forms the cell, and may include, by way of illustration, a material whose coefficient of thermal expansion is different from that of the cells by $2\times10^{-6}$ (/K) or smaller, such as zirconia, magnesia, spinel ceramics, and the composite materials thereof. Further, the materials may be a metal as long as it is resistant to oxidation and reduction at the operating temperatures of the electrochemical cell. Although the metal may be a pure metal or an alloy, nickel, a nickel base alloy such as inconel or Nichrome, an iron base alloy such as stainless, and a cobalt base alloy such as stellite are preferable.

In a preferable embodiment, a recessed section is formed in the first flange section, while a protrusion is formed on the first sealing member. Then, the protrusion is caused to engage with the recessed section due to the difference in thermal expansion between the first flange section and the first sealing member.

FIG. 6(a) is a cross-sectional view schematically showing a structure according to this embodiment, and FIG. 6(b) is a cross-sectional view showing directions of thermal expansion of the first flange section and the first sealing member.

As shown in FIG. 6(a), in the first sealing member 17, its contact surface 17c on the cell side does not include any protrusion formed thereon, while its contact surface 17b opposed to the first flange section 4a include a protrusion 17a formed thereon. Preferably, at least one pair of the protrusions 17a is provided on both sides of a feed port 2 or discharge port 3, and more preferably, the protrusions 17a are provided across all the circumference of the flange section. On the other hand, a recessed section 22 is formed in a contact surface 20 of the first flange section 4a to be contacted with the sealing member. Then, the protrusions 17a are respectively fitted in each of the recessed sections 22 formed in the flange section.

Here, in this embodiment, a difference in coefficients of thermal expansion between the solid electrolyte film on a surface of the cell 1 and sealing member 17 is minimized or equalized. Although the sealing member 17 and the cell 1 contract as indicated by an arrow E in the course of cooling in a process of joining the cell 1 and the flange section, a difference in contraction between the sealing member and the cell is small, which can contribute to an increased joining strength between the sealing member and the cell. On the other hand, in this embodiment, the coefficient of thermal expansion of the flange section 4a is set so as to be greater than that of the sealing member 17. In the course of the cooling, the flange section 4a undergoes thermal contraction as indicated by an arrow D, and an amount of this contraction is greater than those of the sealing member and the cell. As a result, each of the protrusions 17a of the sealing member is firmly bonded to the flange section 4a along an outer interface 31. It should be noted that a gap or a weakly bonded region 30 might appear on an inner side of the protrusion 17a in some cases.

Formation of such a firmly bonded region 31 can increase the bonding strength between the flange section and the cell.

From the viewpoint of the above-described action effect, the difference in the coefficient of thermal expansion between the solid electrolyte film on the surface of the cell 1 and the sealing member 17 does preferably not exceed $1.0\times10^{-6}$ (/K), and more preferably not exceed $0.5\times10^{-6}$ (/K).

Also, from the viewpoint of the above-described action effect, the difference in the coefficient of thermal expansion between the sealing member 17 and the flange section 4a is preferably not smaller than $2.0\times10^{-6}$ (/K), and more preferably not smaller than $3.0\times10^{-6}$ (/K). In addition, since the joining strength rather tends to decline when the difference is excessively great, the difference in the coefficient of thermal expansion between the sealing member 17 and the flange section 4a does preferably not exceed $4.0\times10^{-6}$ (/K), and more preferably not exceed $3.5\times10^{-6}$ (/K).

On the other hand, in another embodiment, the difference in the coefficient of thermal expansion between the solid electrolyte film and the sealing member 17 is minimized or equalized. Also in this embodiment, the coefficient of thermal expansion of the flange section is set so as to be smaller than that of the sealing member 17. In this way, the cell and the sealing member undergoes thermal contraction greater than that of the flange section in the course of cooling. As a result, each of the protrusions 17a of the sealing member is firmly bonded to the flange section 4a along the interface on the inner circumferential side. It should be noted that a gap or a weakly bonded region might appear in the outer side of the protrusion 17a.

Formation of such a firmly bonded region can improve the bonding strength between the flange section and the cell.

From the viewpoint of the above-described action effect, the difference in the coefficient of thermal expansion between the solid electrolyte film and the sealing member 17 does preferably not exceed $1.0 \times 10^{-6}$ (/K), and more preferably not exceed $0.5 \times 10^{-6}$ (/K).

Also from the viewpoint of the above-described action effect, the difference in the coefficient of thermal expansion between the sealing member 17 and the flange section is preferably not smaller than $2.0 \times 10^{-6}$ (/K), and more preferably not smaller than $3.0 \times 10^{-6}$ (/K). In addition, since the joining strength rather tends to decline when the difference is excessively great, the difference in the coefficient of thermal expansion between the sealing member 17 and the flange section does preferably not exceed $4.0 \times 10^{-6}$ (/K), and more preferably not exceed $3.5 \times 10^{-6}$ (/K).

Moreover, in a preferable embodiment, the recessed section is formed in the cell, while the protrusion is formed on the first sealing member. Then, the protrusion is caused to engage with the recessed section due to the difference in thermal expansion between the cell and the first sealing member.

Figure 7:
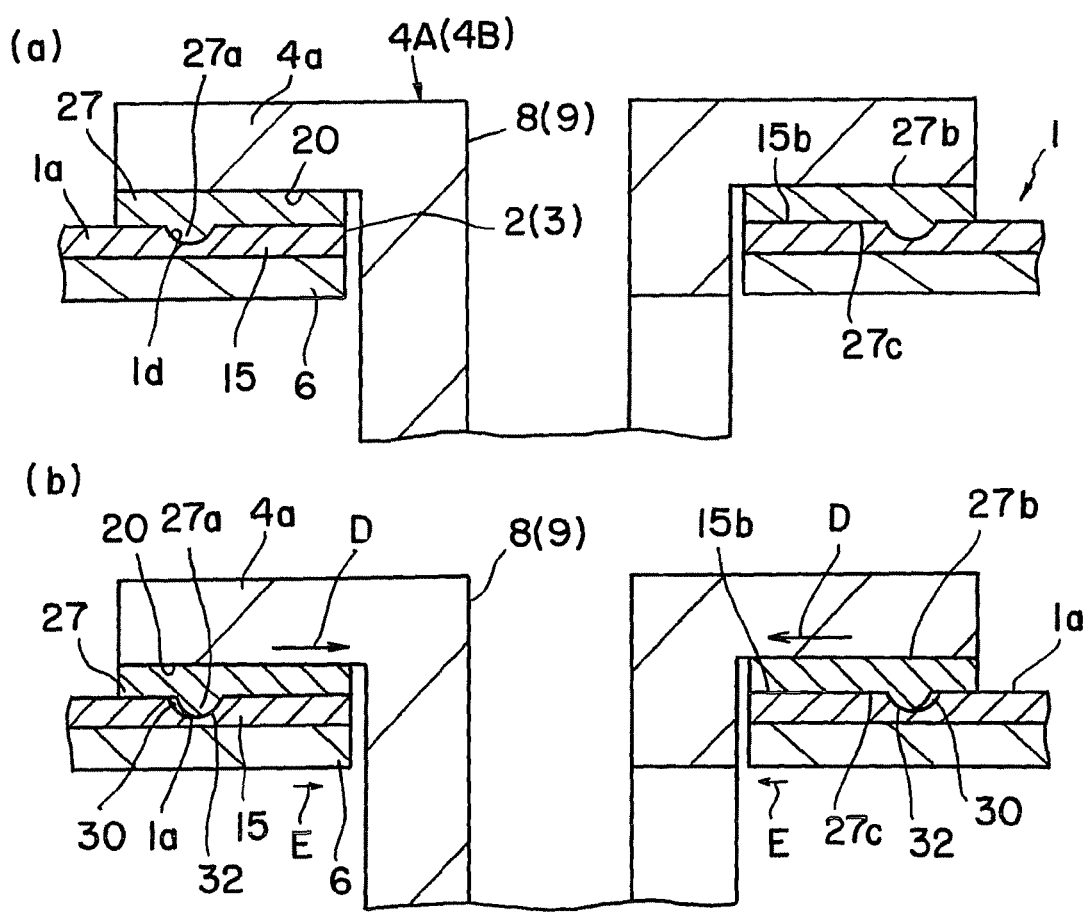
FIG. 7(a) is an enlarged view showing one example of the method for engaging the first sealing member with the cell.
FIG. 7(b) is an enlarged view showing thermal expansion of the first sealing member and the cell.

FIG. 7($a$) is a cross-sectional view schematically showing a structure according to this embodiment, and FIG. 7($b$) is a cross-sectional view showing directions of the thermal expansion of the cell and the first sealing member.

As shown in FIG. 7($a$), in the first sealing member 27, its contact surface 27$b$ on a flange section side does not include any protrusion formed thereon, while its contact surface 27$c$ opposed to the cell includes the protrusion 27$a$ formed thereon. Preferably, at least one pair of the protrusions 27$a$ is provided on both sides of the feed port 2 or discharge port 3, and more preferably, the protrusions 27$a$ are provided across all the circumference of the flange section. On the other hand, a recessed section 1$d$ is formed in a contact surface 1$a$ of the solid electrolyte film on the surface of the cell 1 to be contacted with the sealing member. Then, the protrusions 27$a$ are respectively fitted in each of the recessed sections 1$d$ provided to the cell.

Here, in this embodiment, the difference in the coefficient of thermal expansion between the flange section 4$a$ and the sealing member 27 is minimized or equalized. Although the sealing member 27 and the flange section 4$a$ contract as indicated by the arrow D in the course of cooling in the process of joining the cell and the flange section, since, at this time, the difference in contraction between the sealing member and the flange section is small, the joining strength between the sealing member and the flange section can be increased. On the other hand, in this embodiment, the coefficient of thermal expansion of the solid electrolyte film on the surface of the cell 1 is set so as to be smaller than that of the sealing member 27. Although the cell 1 undergoes thermal contraction as indicated by the arrow E in the course of cooling, an amount of this contraction is smaller than those of the sealing member and the flange section. As a result, each of the protrusions 27$a$ of the sealing member is firmly bonded to the cell 1 along the inner interface 32. It should be noted that the gap or the weakly bonded region 30 might appear on the outer side of the protrusion 27$a$.

Formation of the thus firmly bonded region 32 can increase the bonding strength between the flange section and the cell.

From the viewpoint of the above-described action effect, the difference in the coefficient of thermal expansion between the flange section 4$a$ and the sealing member 27 does preferably not exceed $1.0 \times 10^{-6}$ (/K), and more preferably not exceed $0.5 \times 10^{-6}$ (/K).

Also from the viewpoint of the above-described action effect, the difference in the coefficient of thermal expansion between the sealing member 27 and the cell is preferably not smaller than $2.0 \times 10^{-6}$ (/K), and more preferably not smaller than $3.0 \times 10^{-6}$ (/K). Still further, since the joining strength rather tends to decline when the difference is excessively great, the difference in the coefficient of thermal expansion between the sealing member 27 and the cell does preferably not exceed $4.0 \times 10^{-6}$ (/K), and more preferably not exceed $3.5 \times 10^{-6}$ (/K).

On the other hand, in another embodiment, the difference in the coefficient of thermal expansion between the flange section and the sealing member 27 is minimized or equalized. Further, in this embodiment, the coefficient of thermal expansion of the solid electrolyte film is set so as to be greater than that of the sealing member 27. In the course of cooling, the amount of thermal contraction of the cell 1 is greater than the amounts of the contraction of the sealing member and the flange section. As a result, each of the protrusions 27$a$ of the sealing member is firmly bonded to the cell 1 along the outer interface. It should be noted that the gap or weakly bonded region 30 might appear in the inner side of the protrusion 27$a$.

From the viewpoint of the above-described action effect, the difference in the coefficient of thermal expansion between the flange section and the sealing member 27 does preferably not exceed $1.0 \times 10^{-6}$ (/K), and more preferably not exceed $0.5 \times 10^{-6}$ (/K).

Also from the viewpoint of the above-described action effect, the difference in the coefficient of thermal expansion between the sealing member and the solid electrolyte film is not smaller than $2.0 \times 10^{-6}$ (/K), and more preferably not smaller than $3.0 \times 10^{-6}$ (/K). Still further, since the joining strength rather tends to decline when the difference is excessively great, the difference in the coefficient of thermal expansion between the sealing member 27 and the solid electrolyte film does preferably not exceed $4.0 \times 10^{-6}$ (/K), and more preferably not exceed $3.5 \times 10^{-6}$ (/K).

Moreover, in a preferable embodiment, the contact surface of the first flange section to be contacted with the first sealing member is treated with surface roughening. Further, in a preferable embodiment, the contact surface of the cell to be contacted with the first sealing member is treated with the surface roughening. The bonding strength between the gas feed tube (discharge tube) and the cell can be increased by performing the surface roughening as described above.

Figure 8:
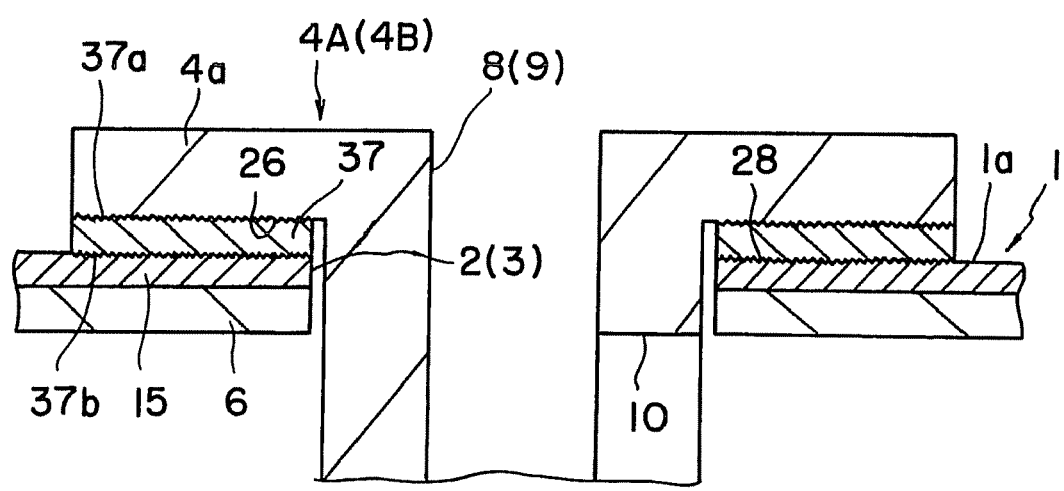
FIG. 8 is an enlarged view showing an example in which contact surfaces of a first flange section and the cell which are in contact with the first sealing member are treated with surface roughening.

In an example of FIG. 8, for example, sealing is performed with a sealing member 37 interposed between the flange section 4$a$ and the cell 1. Here, a contact surface 26 of the flange section 4$a$ is treated with the surface roughening, while a contact surface 28 of the cell 1 to be contacted with the sealing member 37 is also treated with the surface roughening. As a result, the bonding strength between the contact surface 37$a$ of the sealing member 37 and the contact surface 26 of the flange section 4$a$, and the bonding strength between the contact surface 37$b$ of the sealing member and the contact surface 28 of the cell can be increased.

For this surface roughening which is not particularly limited, waterproof abrasive paper or sand blasting may be exemplified.

From the viewpoint of the action effect in this embodiment, arithmetic mean surface roughness Ra of the contact surface 26 of the flange section 4$a$ and the contact surface 28 of the cell is preferably not smaller than 70 μm, and more preferably not smaller than 90 μm.

Here, a joined structure of the cells 1, the gas feed tubes, and the gas discharge tubes as shown in FIGS. 1 to 5 was produced.

Specifically, the solid electrolytes of the cells were produced using yttria-stabilized zirconia, the air electrodes were produced using lanthanum strontium manganite, and the fuel electrodes were produced using Ni/YSZ cermet. The gas feed tubes, the discharge tubes, and the washers were produced using magnesium oxide. A length of the flange section 4a was set to 5.5 mm. The sealing members were produced using $LiO_2$—$Al_2O_3$—$SiO_2$ based glass.

The coefficient of thermal expansion of the solid electrolyte film on the surface of the cell was $10.6 \times 10^{-6}$ (/K), the coefficients of thermal expansion of the gas feed and discharge tubes were $13.2 \times 10^{-6}$ (/K), and the coefficient of thermal expansion of the sealing member was $10.0 \times 10^{-6}$ (/K). For the bonding, an assembly of the cells, the gas feed tubes, the gas discharge tubes and the sealing members were heated at 1000° C.

Figure 6:
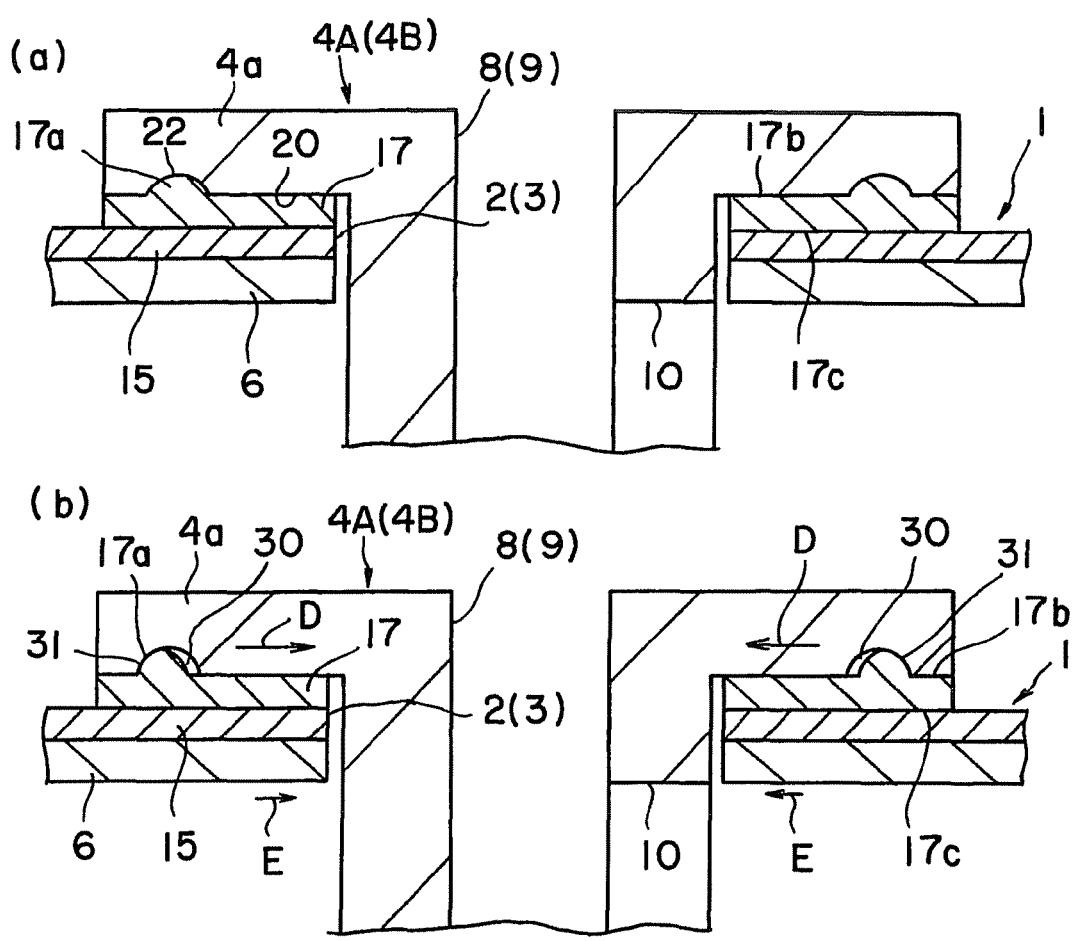
FIG. 6(a) is an enlarged view showing one example of a method for engaging a first sealing member with the cell.
FIG. 6(b) is an enlarged view showing thermal expansion of the first sealing member and the cell.

However, in Example 1, the contact surface of the flange section was not subjected to the surface treatment (FIGS. 2 and 5). In Examples 2 and 3, the contact surface of the flange section was surface-roughened by means of waterproof abrasive paper (FIG. 8). In Example 4, the contact surface of the flange section was not treated by surface roughening, while the recessed portion 2 was formed as well as the projection 17a on the sealing member side (FIG. 6).

The joining strength of each bonded body obtained was measured, and the results are shown on Table 1.

Figure 9:
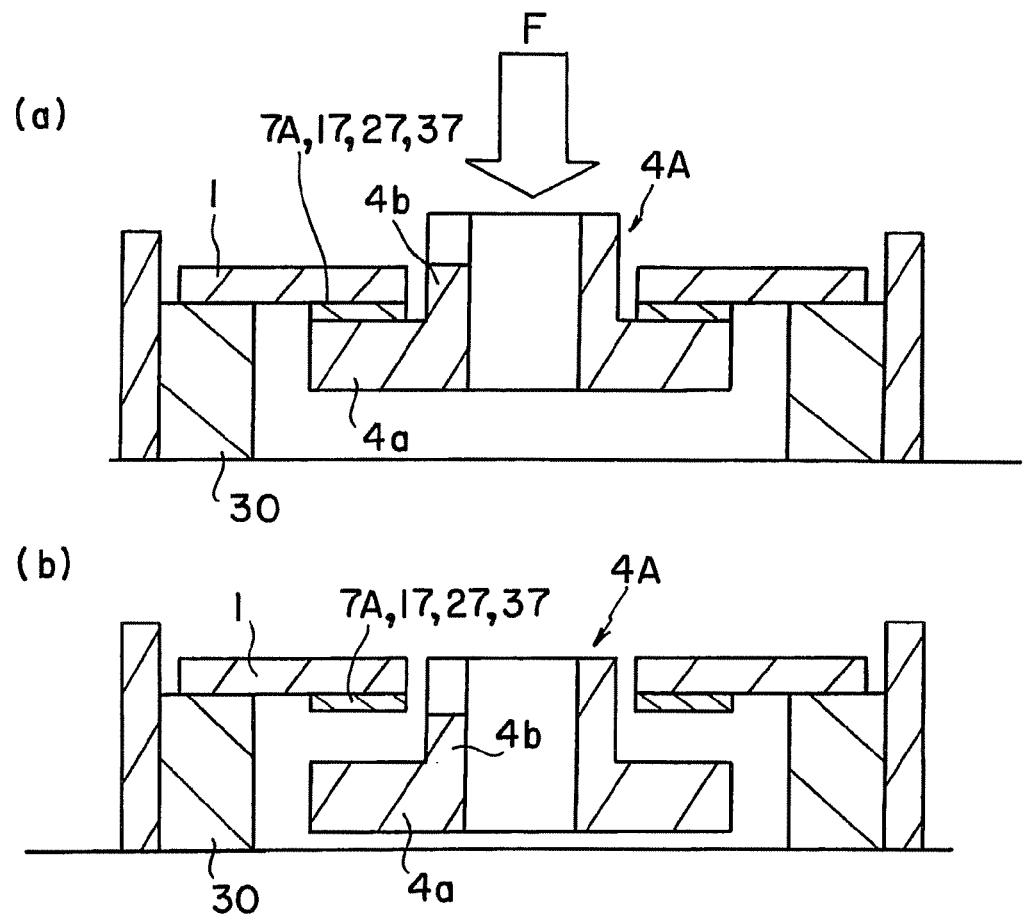
FIG. 9(a) is a schematic cross-sectional view for explaining a test method for measuring a joining strength between the cell and the flange section.
FIG. 9(b) is a schematic cross-sectional view showing, in a separated state, the cell and the flange section.

FIGS. 9(a) and 9(b) are schematic diagrams showing a method for measuring the joining strength.

Namely, as shown in FIG. 9(a), the cell 1 was firmly fixed on a base 30. Then, a stress F is applied to the gas feed tube 4A. As shown in FIG. 9(b), the stress F having been applied when the gas feed tube 4A was separated from the cell 1 was defined as a measured strength.

TABLE 1

| | Contact Surfaces 20, 26 of flange portion of Gas supply (discharge) member | | | |
|---|---|---|---|---|
| | Treatment of Contact face | arithmetic mean surface roughness of contact face | Width of Recess 22 | Joining Strength |
| Example 1 | No surface treatment | 1 μm | None | 20 kgf |
| Example 2 | Surface Roughening | 70 μm | None | 40 kgf |
| Example 3 | Surface Roughening | 90 μm | None | 50 kgf |
| Example 4 | Recess 22 is formed | 1 μm | 2.3 mm | 50 kgf |

It can be understood from the results on Table 1 that the joining strength of the flange section is remarkably increased by treating the contact surface with surface roughening or forming the recessed section 22.

Although the specific embodiments of the present invention have been described, the present invention is not limited to the specific embodiments, and may be implemented while applying various changes or modifications without departing from the scope of claims.

The invention claimed is:

1. An electrochemical apparatus comprising a plurality of ceramic electrochemical cells, a plurality of gas feed members and a plurality of gas discharge members, wherein:
each electrochemical cell comprises a first electrode contacting with a first gas, a solid electrolyte layer and a second electrode contacting with a second gas;
a gas flow channel for flowing the first gas therethrough is formed inside the first electrode;
a first through hole and a second through hole are provided in the each electrochemical cell;
a gas feed member is inserted into the first through hole;
a gas discharge member is inserted into the second through hole;
adjacent gas feed members are airtightly coupled to each other to thereby form a gas feed channel;
adjacent gas discharge members are airtightly coupled to each other to thereby form a gas discharge channel;
the gas feed channel and the gas discharge channel are communicated with the gas flow channel; and
the electrochemical cells are supported by the gas feed members and the gas discharge members so that the electrochemical cells are spaced apart from each other, and wherein all of the gas feed members are arranged coaxially; and all of the gas discharge members are arranged coaxially.

2. The electrochemical apparatus of claim 1, wherein:
the gas feed member comprises a tubular section inserted into the first through hole, a first flange section provided on one end of the tubular section, and a second flange section provided on the other end of the tubular section;
a first sealing member is installed between the first flange section and the electrochemical cell; and
a second sealing member is installed between the second flange section and the electrochemical cell.

3. The electrochemical apparatus of claim 2, wherein the second flange section comprises a separate body from the tubular section.

4. The electrochemical apparatus of claim 1, wherein:
the gas discharge member comprises a tubular section inserted into the second through hole, a first flange section provided on one end of the tubular section, and a second flange section provided on the other end of the tubular section;
a first sealing member is installed between the first flange section and the electrochemical cell; and
a second sealing member is installed between the second flange section and the electrochemical cell.

5. The electrochemical apparatus of claim 4, wherein the second flange section comprises a separate body from the tubular section.

6. The electrochemical apparatus of claim 1, wherein a difference in coefficient of thermal expansion between the gas feed member and the electrochemical cell does not exceed $2 \times 10^{-6}$ (/K).

7. The electrochemical apparatus of claim 1, wherein a difference in coefficient of thermal expansion between the gas discharge member and the electrochemical cell does not exceed $2 \times 10^{-6}$ (/K).

8. The electrochemical apparatus of claim 2, wherein:
a recessed section is formed in the first flange section;
a protrusion is formed on the first sealing member; and
the protrusion is caused to engage with the recessed section due to a difference in thermal expansion between the first flange section and the first sealing member.

9. The electrochemical apparatus of claim 4, wherein:
a recessed section is formed in the first flange section;
a protrusion is formed on the first sealing member; and
the protrusion is caused to engage with the recessed section due to a difference in thermal expansion between the first flange section and the first sealing member.

10. The electrochemical apparatus of claim 2, wherein:
a recessed section is formed in the solid electrolyte layer;
a protrusion is formed on the first sealing member; and
the protrusion is caused to engage with the recessed section due to a difference in thermal expansion between the solid electrolyte layer and the first sealing member.

11. The electrochemical apparatus of claim 4, wherein:
a recessed section is formed in the solid electrolyte layer;
a protrusion is formed on the first sealing member; and
the protrusion is caused to engage with the recessed section due to a difference in thermal expansion between the solid electrolyte layer and the first sealing member.

12. The electrochemical apparatus of claim 2, wherein a contact surface of the first flange section to be contacted with the first sealing member is treated by surface roughening.

13. The electrochemical apparatus of claim 4, wherein a contact surface of the first flange section to be contacted with the first sealing member is treated by surface roughening.

14. The electrochemical apparatus of claim 2, wherein a contact surface of the cell to be contacted with the first sealing member is treated by surface roughening.

15. The electrochemical apparatus of claim 4, wherein a contact surface of the cell to be contacted with the first sealing member is treated by surface roughening.

16. The electrochemical apparatus of claim 3, wherein:
a recessed section is formed in the first flange section;
a protrusion is formed on the first sealing member; and
the protrusion is caused to engage with the recessed section due to a difference in thermal expansion between the first flange section and the first sealing member.

17. The electrochemical apparatus of claim 5, wherein:
a recessed section is formed in the first flange section;
a protrusion is formed on the first sealing member; and
the protrusion is caused to engage with the recessed section due to a difference in thermal expansion between the first flange section and the first sealing member.

18. The electrochemical apparatus of claim 3, wherein:
a recessed section is formed in the solid electrolyte layer;
a protrusion is formed on the first sealing member; and
the protrusion is caused to engage with the recessed section due to a difference in thermal expansion between the solid electrolyte layer and the first sealing member.

19. The electrochemical apparatus of claim 5, wherein:
a recessed section is formed in the solid electrolyte layer;
a protrusion is formed on the first sealing member; and
the protrusion is caused to engage with the recessed section due to a difference in thermal expansion between the solid electrolyte layer and the first sealing member.

20. The electrochemical apparatus of claim 3, wherein a contact surface of the first flange section to be contacted with the first sealing member is treated by surface roughening.

21. The electrochemical apparatus of claim 5, wherein a contact surface of the first flange section to be contacted with the first sealing member is treated by surface roughening.

22. The electrochemical apparatus of claim 3, wherein a contact surface of the cell to be contacted with the first sealing member is treated by surface roughening.

23. The electrochemical apparatus of claim 5, wherein a contact surface of the cell to be contacted with the first sealing member is treated by surface roughening.

24. The electrochemical apparatus of claim 1, wherein:
adjacent gas feed members are directly coupled to each other to form the gas feed channel; and
adjacent gas discharge members are directly coupled to each other to form the gas discharge channel.

* * * * *